United States Patent Office 3,422,059
Patented Jan. 14, 1969

3,422,059
STABILIZED POLYOLEFINS
George Wright Taylor and Derek Harold Wood, Harrogate, England, assignors to Imperial Chemical Industries Limited, London, England, a corporation of Great Britain
No Drawing. Filed Mar. 28, 1966, Ser. No. 537,690
Claims priority, application Great Britain, May 3, 1965, 18,516/65
U.S. Cl. 260—45.85          9 Claims
Int. Cl. C08f 45/58; C08f 29/02; C07c 69/76

This invention relates to stabilized polyolefins, in particular to polyolefin compositions which, in the form of shaped articles, retain their stability after many laundry treatments.

It is well known that polyolefins, in particular those containing tertiary carbon atoms, are subject to degradation by several influences, as for example ultra-violet light, heat and oxygen. Many attempts have been made to stabilize the polyolefin material against these degradative influences with varying degrees of success. Unfortunately some of the most effective stabilizing agents are unsatisfactory as stabilizers for polyolefins in the form of shaped articles, as for example, filaments and fibres which are subject to solvent and washing treatments as in dry cleaning and laundering, for the stabilizing effect is rapidly lost by extraction of the stabilizer or stabilizers from the articles.

We have now found that certain diol dialkanoates are very effective antioxidants in polyolefin articles and that such articles are highly resistant to, for example, laundering.

According to the invention we provide a stabilized polyolefin composition wherein there is incorporated either alone or in combination with other polyolefin stabilizers an antioxidant which is a diol dialkanoate of the formula

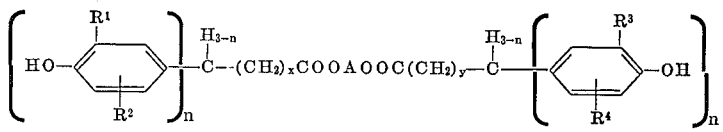

where $R^1$, $R^2$, $R^3$ and $R^4$ are hydrogen, alkyl, or alkoxyl groups, $n$ is 2 or 3, $x$ and $y$ have the value 0, 1, 2, or 3 and A is derived from a diol said diol being an alkane diol, a thiodialkanol or a poly(ethylene glycol). Thus, A may be straight-chain alkylene or monothioalkylene containing 3–10 carbon atoms.

Diol dialkanoates according to the invention may be conveniently prepared by ester interchange between the relatively high boiling diol and a lower alkyl ester, as for example, the methyl ester of the appropriate phenolic acid. The ester interchange reaction may be facilitated by the use of an appropriate catalyst, as for example, zinc or calcium acetate or a tetraalkyl titanate. This method may be used to prepare diol dialkanoates having different phenolic groups at the two ends of the dialkanoate molecules by carrying out the ester interchange between the diol and a mixture of lower alkyl esters of different phenolic acids. In this case a mixture of products would be formed including diesters having different phenolic groups at the ends of the molecule. Such mixtures may be used to stabilize polyolefins without separation of the individual diesters therein.

Preferred diols from which esters according to the invention are derived are those which contain at least 3 carbon atoms or at least two ethylenoxy groups.

Phenolic diesters wherein a single phenolic group is present in the carboxylic acid from which they are derived are known but these in general exhibit a lesser stabilizing effect, particularly on repeated laundering, than the esters of the present invention. It is preferred that at least one substituent alkyl or alkoxy group (any one or more of the $R^1$, $R^2$, $R^3$ and $R^4$ groups) should be present in the phenolic nuclei ortho to the phenolic hydroxyl group, for in this way, particularly if this substituent group is a bulky one, the antioxidant effectiveness of the phenolic portion of the diester is enhanced due to steric hinderance of the phenolic hydroxyl group. Compounds according to the invention wherein the phenolic groups each have two bulky substituents, as for example tertiary butyl groups, each in an ortho position with respect to the phenolic hydroxyl group, are very effective stabilizing substances.

Diesters according to the invention protect polyolefins into which they are incorporated against oxidative degradation and in general 0.05 to 5% by weight of the polyolefin is an effective amount. As polyolefins are also subject to other degradative effects it is often desirable to incorporate one or more additional stabilizing substances, as for example an ultraviolet light absorber or thermal stabilizer.

Diesters according to the invention are incorporated into polyolefins by any method, as for example mixing of the powdered polyolefin with the solution of the additive in a volatile solvent followed by drying and granulation of the mixture or by mixing the additive directly into the softened polyolefin in a hot roll or Banbury mixer.

The present invention may be applied to any polyolefin and we have found it to be most useful for improving the stability of stereoregular polyolefins, particularly those, as for example stereoregular poly(4-methylpentene-1) or isotactic polypropylene, from which useful textile fibres or filaments may be produced.

The examples which follow illustrate the invention and the manner in which it may be performed. In these examples all parts are by weight.

EXAMPLE 1

Preparation of decamethylene diol di[bis(3,5-di-tert.-butyl-4-hydroxyphenyl)acetate]

Methyl di-(3,5-di-tert-butyl-4-hydroxyphenol) acetate (7.2 parts) and decamethylene diol (1.3 parts) are heated together under a flow of nitrogen gas. When the mixture becomes molten tetra-n-butyl titanate solution in n-butanol (1 part in 4 parts of butanol) is added as catalyst for the ester interchange reaction. The mixture is then heated to 160°–170° C. for seven hours, cooled and the solid product, decamethylene diol di[bis(3,5-di-tert-butyl-4-hydroxyphenyl)acetate], after recrystallization from petroleum ether (boiling range 40–60° C.) has a melting point of 172–178° C. The yield of product is 77% of the theoretical amount.

Effectiveness of stabilization

The diester (0.5 part) prepared as above is incorporated into polypropylene (100 parts) together with a thermal stabilizer, dilauryl-$\beta,\beta^1$-thiodipropionate (0.5 part) and the mixture is melt spun and drawn into filamentary yarn of 720 denier having 144 filaments and 4 turns per inch of twist inserted therein. Hanks of the yarn together with similar yarn containing a commercial antioxidant (the condensation product from 3-methyl-6-tert-butylphenol and crotonaldehyde) in place of the foregoing antioxidant are subjected to repeated cycles of a laundering process, which consists in agitating the hanks in boiling soap solution (5 parts of textile soap and 2 parts of sodium carbonate in 1000 parts of water) for 1 hour following by rinsing in fresh water and drying at 140° C. for one hour in a Wallace ageing oven until the hank at least partially breaks when subjected to a vigorous tug with the fingers.

Yarn stabilized with antioxidant prepared as described above survives 23 laundering cycles whereas that containing the commercial antioxidant survives only 8–9 cycles.

In an even more severe laundering process, wherein the hanks are boiled in the soap solution for 30 minutes and dried in a Wallace oven at 150° C. for 1 hour, yarn stabilized with the foregoing antioxidant according to the invention survives 17 laundering cycles and the control yarn containing the commercial antioxidant survives 6 cycles.

EXAMPLE 2

Preparation of hexamethylene diol di-[bis-(3,5 di-tert-butyl-4-hydroxyphenol)-acetate]

Methyl di-(3,5-di-tert-butyl-4-hydroxyphenyl) acetate (14.5 parts) and hexamethylene diol (1.8 parts) are heated tigether under a flow of nitrogen gas at 160–170° C. for about 16 hrs. and a trace of tetra-n-butyl titanate is then added as a catalyst and the mixture heated at 170–180° C. for a further 23 hours. The mixture is cooled and the solid product hexamethylene diol di-[bis-(3,5-di-tert-butyl-4-hydroxy-phenyl) acetate] after recrystallization from petroleum ether (boiling range 100–120°) has a melting point of 173–181° C. The yield of product is 80% of the theoretical amount.

When this diester ((0.5 part) is incorporated into isotactic polypropylene (100 parts) together with dilauryl-$\beta,\beta'$-thiodipropionate (0.5 part) and spun into yarn as described in Example 1, the resultant yarn survives 15 cycles of laundering according to the more severe laundering process (drying at 150° C.) of Example 1.

EXAMPLE 3

Preparation of decamethylene diol di-[4,4-bis-(2-methyl-4-hydroxy-5-tert-butylphenyl) butanoate]

Ethyl 4,4-bis(2-methyl-4-hydroxy-5-tert-butylphenyl) butanoate (8.8 parts) and decamethylene diol (1.7 parts) are heated together under a flow of nitrogen gas at 170° C. for about 16 hours and a trace of tetra-n-butyl titanate is added as a catalyst and the mixture heated at 170° C. for a further 8 hours. The mixture is cooled and the solid product decamethylene diol di-[4,4-bis-(2-methyl-4-hydroxy-5-tert-butylphenyl) butanoate] after recrystallization from petroleum ether has a melting point of 120–124° C. The yield of product is 76% of the theoretical amount.

When this diester (0.5 part) is incorporated into isotactic polypropylene (100 parts) together with dilauryl-$\beta,\beta'$-thiodipropionate (0.5 part) and spun into yarn as described in Example 1, the resultant yarn survives 12 cycles (drying temp. 150° C.) of the severe laundering process.

EXAMPLE 4

Preparation of 4,4'-thiodibutanol di-[bis-(3,5-di-tert-butyl-4-hydroxyphenyl) acetate]

Methyl di-(3,5-di-tert-butyl-4-hydroxyphenol) acetate (7.2 parts) and 4,4'-thiodibutanol (1.3 parts) are heated together under a flow of nitrogen gas. When the mixture becomes molten a trace of tetra-n-butyl titanate solution in n-butanol (1 part in 4 parts of butanol) is added as catalyst for the ester interchange reaction. The mixture is then heated to 180–200° C. for 2½ hours, cooled and the solid product 4,4'-thiodibutanol di[bis(3,5 di-tert-butyl-4-hydroxyphenyl) acetate] is washed with petroleum ether (boiling range 40–60° C.) to yield a product melting at 69–76° C. The yield of product is 55% of the theoretical amount.

When this diester (0.5 part) is incorporated into isotactic polypropylene (100 parts) together with dilauryl-$\beta,\beta'$-thiodipropionate (0.5 part) and spun into yarn as described in Example 1, the resultant yarn survives 12 cycles (drying temp. 150° C.) of the severe laundering process.

As one skilled in the art may judge from the foregoing examples diesters according to the invention are effective antioxidants for polyolefins and incorporated therein are very resistant to severe laundering and drying treatments. Simpler esters wherein only a single phenolic group is present at the ends of the diester molecule, as for example the following compounds:

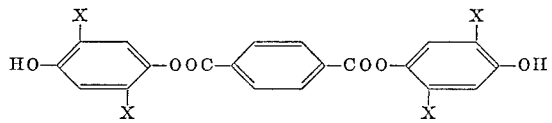

and

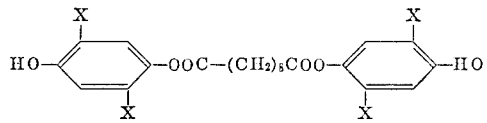

wherein X is a tert-butyl group, survive only 3–6 cycles of the severe (drying at 150° C.) laundering process.

What we claim is:

1. A stabilized poly-$\alpha$-olefin composition comprising the poly-$\alpha$-olefin and, as a stabilizer therefor, an antioxidant diol dialkanoate of the formula:

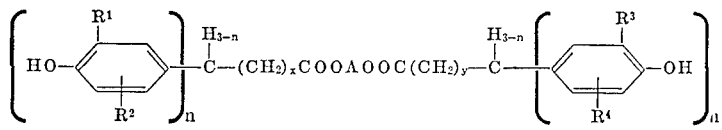

wherein $R^1$, $R^2$, $R^3$ and $R^4$ are selected from the group consisting of hydrogen and lower alkyl, $n$ is 2 or 3, $x$ and $y$ have the value 0, 1, 2 or 3 and A is derived from a diol selected from the group consisting of an alkane diol and monothiodialkanol.

2. A stabilized poly-$\alpha$-olefin composition according to claim 1 wherein the phenolic hydroxyl groups of the diester are sterically hindered.

3. A stabilized poly-$\alpha$-olefin composition according to claim 2 wherein the phenolic hydroxyl groups of the diester are sterically hindered by tertiary-butyl groups.

4. A stabilized poly-$\alpha$-olefin composition according to claim 1 wherein 0.05–5% by weight of the polyolefin of the diol dialkanoate is present.

5. A stabilized poly-$\alpha$-olefin composition according to claim 1 wherein the poly-$\alpha$-olefin is a stereoregular poly-$\alpha$-olefin.

6. A stabilized poly-$\alpha$-olefin composition according to claim 5 wherein the poly-$\alpha$-olefin is stereoregular poly(4-methylpentene-1) or isotactic polypropylene.

7. A stabilized poly-$\alpha$-olefin composition according to claim 1 wherein the antioxidant is selected from the group consisting of decamethylene diol di[bis(3,5-di-tert.-butyl-4-hydroxyphenyl) acetate]; hexamethylene diol di-[bis-3,5 di-tert.-butyl-4-hydroxyphenyl)-acetate]; decamethylene diol di-[4,4-bis-(2-methyl-4-hydroxy-5-tert.-butylphenyl) butanoate; and 4,4′-thiodibutanol di-[bis-(3,5-di-tert-butyl-4-hydroxyphenyl) acetate].

8. A stabilized poly-α-olefin composition according to claim 1 wherein $R^1$, $R^2$, $R^3$ and $R^4$ are each lower alkyl, at least one of $R^1$ and $R^2$ and at least one of $R^3$ and $R^4$ being tertiary-butyl; $n$ is 2 or 3; $x$ and $y$ have the value 0, 1, 2 or 3 and A is straight-chain alkylene or monothioalkylene containing 3–10 carbon atoms.

9. Yarn comprising a stabilized poly-α-olefin composition according to claim 1.

References Cited

UNITED STATES PATENTS 3,005,828  10/1961  Baldridge et al. _____ 260—326

DONALD E. CZAJA, *Primary Examiner.*

V. P. HOKE, *Assistant Examiner.*

U.S. Cl. X.R.

260—45.95, 469, 470